US010765259B2

(12) United States Patent
Sahli et al.

(10) Patent No.: US 10,765,259 B2
(45) Date of Patent: Sep. 8, 2020

(54) GRINDER FOR COFFEE MACHINE

(71) Applicant: JURA Elektroapparate AG, Niederbuchsiten (CH)

(72) Inventors: Georg Sahli, Ersingen (CH); Stephan Probst, Lohn-Ammannsegg (CH); Philipp Buettiker, Oberbuchsiten (CH)

(73) Assignee: JURA Elektroapparate AG, Niederbuchsiten (CH)

( * ) Notice: Subject to any disclaimer, the term of this patent is extended or adjusted under 35 U.S.C. 154(b) by 910 days.

(21) Appl. No.: 15/205,228

(22) Filed: Jul. 8, 2016

(65) Prior Publication Data

US 2017/0007075 A1  Jan. 12, 2017

(30) Foreign Application Priority Data

Jul. 10, 2015  (EP) .................................... 15405045

(51) Int. Cl.
| | |
|---|---|
| *A47J 42/06* | (2006.01) |
| *A47J 42/38* | (2006.01) |
| *A47J 31/42* | (2006.01) |
| *A47J 42/10* | (2006.01) |
| *A47J 42/40* | (2006.01) |

(52) U.S. Cl.
CPC ............... *A47J 42/06* (2013.01); *A47J 31/42* (2013.01); *A47J 42/10* (2013.01); *A47J 42/38* (2013.01); *A47J 42/40* (2013.01)

(58) Field of Classification Search
CPC .. A47J 31/42; A47J 42/06; A47J 42/10; A47J 42/38; A47J 42/40

USPC .......... 99/286, 287; 241/30, 100, 37, 261.2, 241/261.3, 259.1
See application file for complete search history.

(56) References Cited

U.S. PATENT DOCUMENTS

| | | | | |
|---|---|---|---|---|
| 8,181,894 | B2* | 5/2012 | Majer | A47J 42/38 241/30 |
| 2012/0001005 | A1* | 1/2012 | Kroesen | A47J 42/16 241/257.1 |
| 2014/0224910 | A1 | 8/2014 | Sahli et al. | |

FOREIGN PATENT DOCUMENTS

| | | |
|---|---|---|
| CN | 203 458 258 U | 3/2014 |
| DE | 91 15 709 U1 | 3/1992 |
| EP | 1 994 866 A1 | 11/2008 |
| EP | 2 404 534 A1 | 1/2012 |
| EP | 2 764 808 A1 | 8/2014 |

OTHER PUBLICATIONS

European Search Report in EP 15 40 5045, dated Jan. 14, 2016, with English translation of relevant parts.

* cited by examiner

*Primary Examiner* — Dana Ross
*Assistant Examiner* — Joseph W Iskra
(74) *Attorney, Agent, or Firm* — Collard & Roe, P.C.

(57) ABSTRACT

An automated coffee machine grinder features two grinding bodies that are rotatable relative to one another about a rotational grinding axis using a driveshaft device as well as an output opening for ground material arranged laterally of the grinding elements. The driveshaft device is positioned divergent from the rotational grinding axis. The output opening and the driveshaft device can be positioned differently relative to one another.

19 Claims, 5 Drawing Sheets

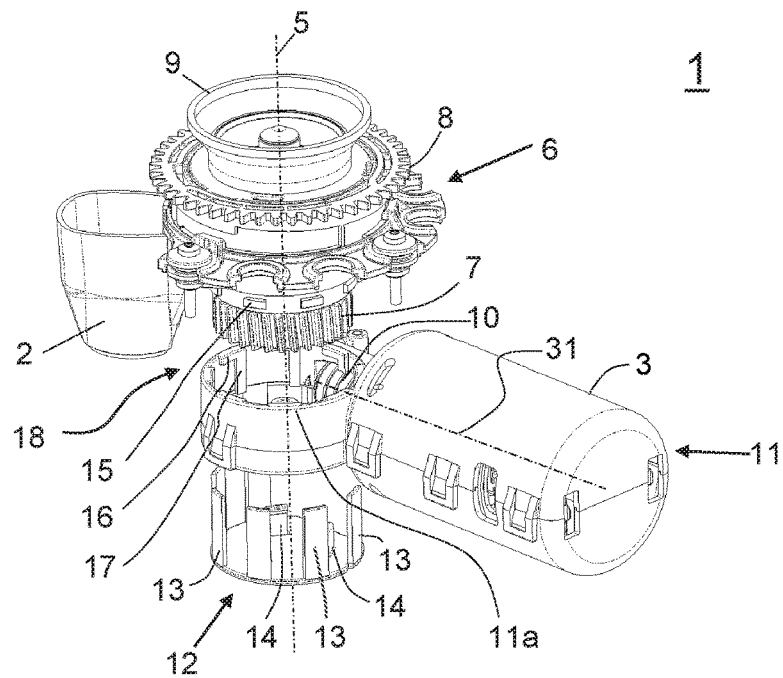
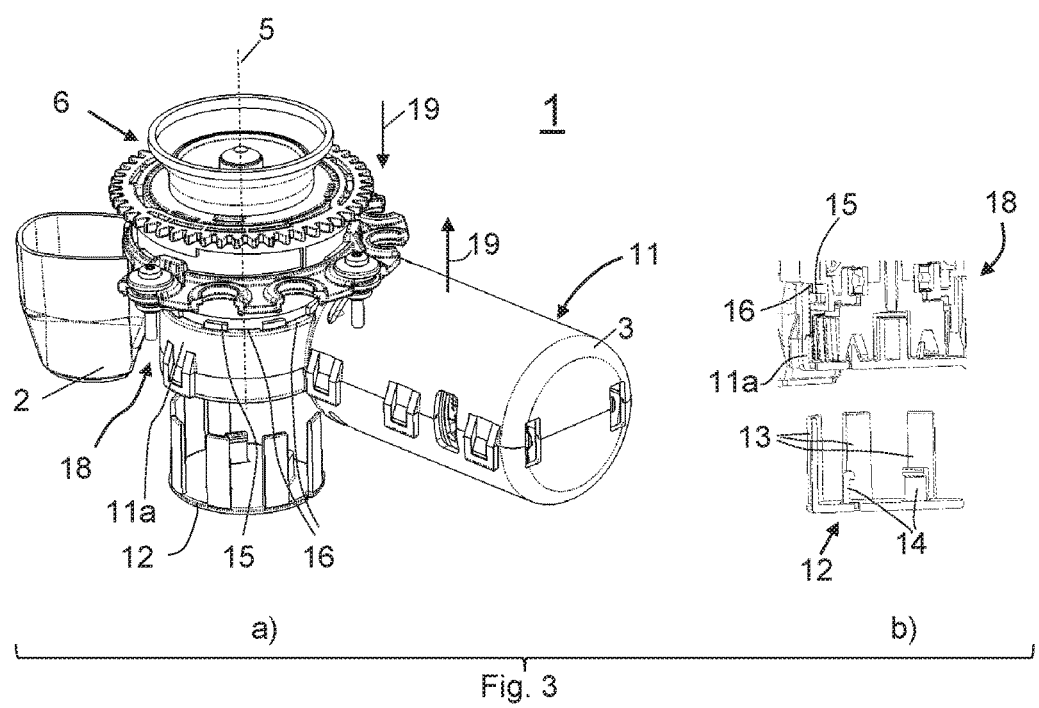

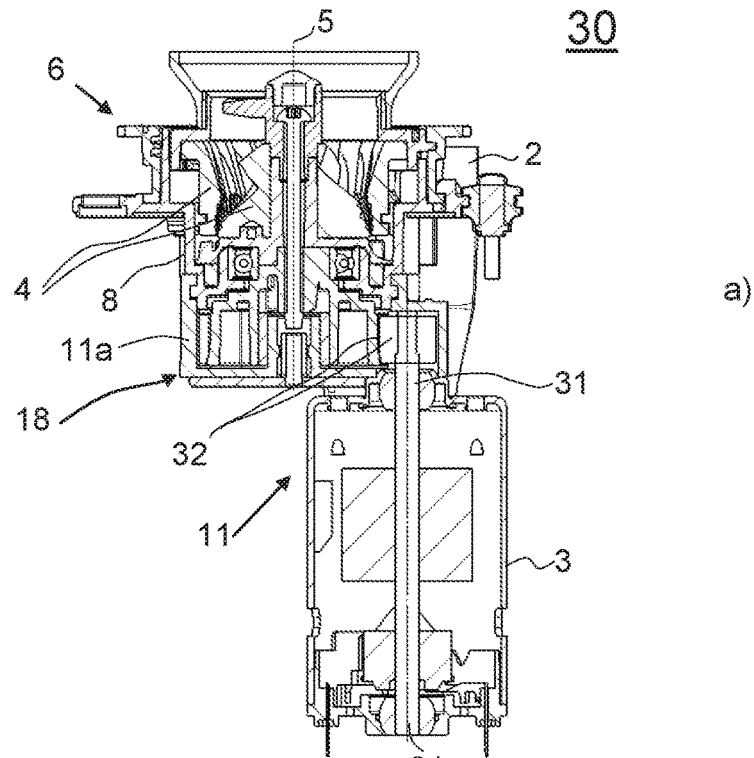
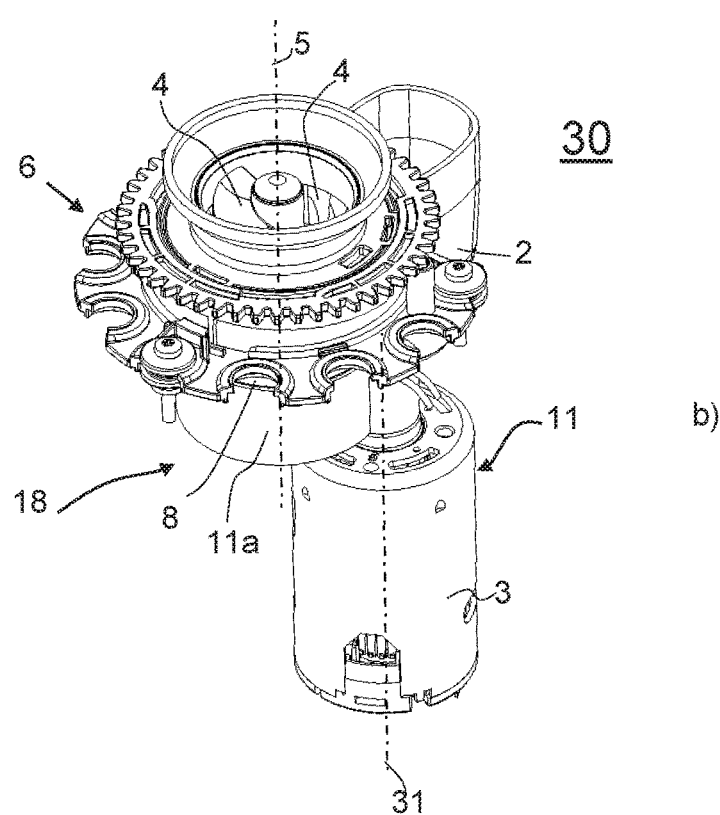
Fig. 8

GRINDER FOR COFFEE MACHINE

CROSS REFERENCE TO RELATED APPLICATIONS

Applicant claims priority under 35 U.S.C. § 119 of European Application No. 15405045.4 filed on Jul. 10, 2015, the disclosure of which is incorporated by reference.

The invention pertains to a grinding device for grinding material to be ground, particularly for grinding coffee beans.

Grinding devices of this type are typically used for the comminution of granular materials, particularly also granular foods. The basic design of grinding devices has been known since ancient times as evidenced by excavated grindstones for grinding grain.

Grinding devices are nowadays still used in many fields of technology, particularly also in the processing of foods. In this context, the term "foods" not only refers to nutriments (for example grain that is ground into flour), but also to natural stimulants such as, for example, coffee beans that have to be comminuted into ground coffee in order to prepare a coffee beverage therewith.

In recent times, a certain "connoisseur culture" has been established, particularly (but not exclusively) with respect to coffee, which is characterized by different principles. On the one hand, there is a trend from hand-operated devices toward automatically operating devices. For example, the hand-operated coffee grinder, which was widely used 100 years ago, has largely become obsolete. Instead, automatically operating devices, typically electric coffee grinders, are nowadays almost exclusively used for this purpose. There is also a second trend from food processing, which requires a plurality of steps to be carried out individually, toward complete automation. For example, fully automated coffee machines, which can automatically prepare a special coffee (such as, for example, Espresso, Cappuccino or Latte Macchiato) from the raw ingredients (water, whole coffee beans and sometimes also milk) at the push of a button and without additional user interventions, can in the meantime be found numerous private households. A third trend can be seen in the use of "less extensively" pre-processed food raw materials. For example, the consumption of whole coffee beans (in comparison with packages of pre-ground coffee) has noticeably increased over the last few years (which can in part be attributed to the increased use of fully automated coffee machines). This trend can also be attributed to higher quality standards (freshly ground coffee has a more intense and better tasting aroma than pre-ground coffee, which "necessarily" has to be stored for several days, weeks or months before it is ultimately consumed, namely even if it is vacuum-packed).

The aforementioned trends are particularly distinct in the chosen example of coffee. However, these trends also exist in other fields. For example, the use of domestic flour mills has steadily increased for years (although to a far lesser extent than it is the case with coffee grinders).

Due to the aforementioned trends, the manufacturers of corresponding devices are confronted with special problems. For example, there is a high demand for compact devices with the smallest possible size, particularly in domestic environments. In addition, there is a demand for a broad spectrum of different devices in order to satisfy the various desires of users with a plurality of heterogeneous preferences. Furthermore, the price sensitivity is also comparatively high such that the purchase price of the corresponding devices should be as low as possible, wherein this requires a correspondingly cost-efficient manufacture of said devices.

Previous fully automated coffee machines, but also previous (electric) domestic coffee grinders, typically feature two grinding bodies—with usually conical surfaces—that can be rotated relative to one another about a rotational axis. In this case, the coffee beans (or other foods) to be ground are introduced into an increasingly tapered gap between the two grinding bodies. The coffee beans are ultimately ground into a powder due to the rotational motion of the grinding bodies relative to one another. The ground coffee powder is collected on the radially outer edge of the gap between the two grinding bodies and discharged through one (or if necessary multiple) coffee powder output openings. In fully automated coffee machines, the thusly ground coffee powder is fed to a brewing unit whereas it is fed to an output container in the case of an (electric) domestic coffee grinder. An electric motor is typically provided for driving the grinder. The corresponding grinders are assembled of the corresponding individual parts in the form of a subassembly and subsequently installed into the corresponding "parent device" (fully automated coffee machine, coffee grinder, etc.).

As already mentioned above, there is a demand for a broad product variety, particularly in the field of household appliances. This demand is not only based on technical reasons, but particularly also on aesthetic considerations (different aesthetic perception of the clientele). However, marketing considerations sometimes also come into play such that, for example, a manufacturer sells different product series under different brand names that optically should be "sufficiently" indistinguishable for readily deducing their origin from a certain individual manufacturing operation.

These considerations represent a problem. Until now, it was necessary to produce correspondingly designed grinders in order to realize a certain "overall product design" (because a certain "overall product design" determines at least to a certain extent the structural space available for the coffee grinder, particularly with respect to its size and shape). Vice versa, only a certain spectrum of "overall product shapes" can be realized with a certain available grinder subassembly and this does not always represent a viable option.

Accordingly, it was previously necessary to produce a comparatively large number of differently designed grinder subassemblies. This is not only associated with increased expenditures because the manufacturing sites must be designed in a correspondingly complex fashion (different production lines or the occasional change of the tools used), but also with an increased stock-keeping effort. These problems not only arise in the stock-keeping for production purposes, but particularly also in making available replacement parts.

Until now, this problem has not been solved irrespective of the fact that certain "compromises" with regard to the design of fully automated coffee machines (or other devices of this type) were frequently agreed upon in the past in order to limit the plurality of different grinder subassemblies to a manageable number.

The present invention accordingly is based on the objective of proposing a grinding device for grinding material to be ground, particularly for grinding coffee beans, which has improved properties in comparison with grinding devices known from the prior art. Another objective of the invention can be seen in proposing a coffee grinder or coffee machine, particularly a fully automated coffee machine, which has improved properties in comparison with coffee grinders, coffee machines or fully automated coffee machines known from the prior art.

These objectives are attained with the proposed invention.

According to the invention, it is proposed that a grinding device for grinding material to be ground, particularly for grinding coffee beans, which features a first grinding element and a second grinding element, as well as an output opening device for ground material that is arranged laterally of the grinding elements, and in which the first grinding element and the second grinding element can be driven by means of a driveshaft device such that they rotate relative to one another about a rotational grinding axis and the driveshaft device is positioned, (i.e.) particularly arranged and/or aligned, divergent from the rotational grinding axis, is realized in such a way that the output opening device and the driveshaft device can be positioned differently relative to one another. The different positioning of the rotational grinding axis and the driveshaft device relative to one another may refer, in particular, to an axial offset (both directions essentially extend parallel to one another, but are spaced apart from one another by certain distance) and/or to a relative angular position between the directions of the driveshaft device and the rotational grinding axis. A "relative angular position" between the driveshaft device and the rotational grinding axis of 90° (right angle) is frequently particularly advantageous. In this case, it is possible that the rotational grinding axis and the (directional axis of the) driveshaft device (almost) intersect in a certain point. However, it would also be conceivable to realize a "combination" of offset and angular position (particularly a right-angled arrangement) such that an angular position of the driveshaft device and the rotational grinding axis is realized. It is conceivable that the driveshaft device and the output opening device can be positioned "in a different number of possible positions" relative to one another. In the typical "minimum instance," they can be positioned in two different positions relative to one another. However, it is frequently also sensible to allow multiple different (discrete) positioning. In this context, it would particularly be conceivable to realize a (partially) symmetric n-fold geometry because a very simple mechanical design can frequently be realized in this way. However, it would also be conceivable that arbitrary angular positions can be assumed. It is also conceivable to realize "combinations," for example, in such a way that continuous positioning within a certain angular range (for example +/−10°) is possible and "further increments" can be realized in the form of a discrete position change; as a result, continuous positioning over a particularly broad angular range can thereby still be achieved. In this context, the different positioning relative to one another may respectively refer to a different type of positioning, particularly to a different arrangement and/or alignment relative to one another. Different types of designs can also be "combined" with one another, for example, such that continuous relative positioning is possible in a certain direction whereas only discrete positioning is possible in another direction. "Essentially" arbitrary types of combinations are naturally also conceivable in this respect. The different positioning of the driveshaft device and the output opening device will frequently consist of a different angular position relative to one another, wherein the different angular position frequently consists of an angular offset that (at least in a projection) is formed in a plane extending normal to the rotational grinding axis. In other words, the output opening device and the driveshaft device may therefore be arranged at the same, but also at different "heights" along the rotational grinding axis. With respect to a plane, in which the rotational grinding axis, as well as the output opening device (particularly a reference point of the output opening device; typically its "center") and the driveshaft device respectively lie, the corresponding planes may include a certain different selectable angle (different positioning). However, it would alternatively or additionally also be conceivable to realize a different angular alignment referred to an output direction of the material to be ground ("slant" of an output channel) and an alignment of the driveshaft such that, if applicable, the corresponding longitudinal directions (almost) intersect in a point or have an angular alignment. It is naturally also possible to provide a multitude of output opening devices rather than only one output opening device. In this context, the output opening devices typically cannot be positioned differently relative to one another (fixed position of the individual output opening devices relative to one another). In this way, each individual output opening device effectively can (in combination with the other output opening devices) moved into a different position relative to the driveshaft device. However, it is likewise conceivable that an individual opening device or a multitude of output opening devices can be positioned differently relative to the driveshaft device whereas the "remaining" output opening devices cannot be positioned differently relative to the driveshaft device. This typically results in some of the output opening devices being movable relative to other output opening devices. The different positioning may also be realized in another way. For example, the grinding device may be designed such that "in essence only" the output opening devices can be moved relative to the remaining multitude of components of the grinding device. However, it would alternatively or additionally also be possible that "in essence only" the driveshaft device can be positioned relative to the remaining multitude of components of the grinding device. For the sake of completeness, it is noted that it is naturally also possible that (some of) the output opening devices contrarily serve for the input of material. Although these output opening devices would have to be correctly referred to as "input opening devices," this is (initially) not done for the sake of simplicity. In the context of this application, however, it is expressly disclosed (and accordingly possible to correspondingly change) that the term "output opening device" can (at least in some of the instances, in which this term is used below) replaced with the term "input opening device," if applicable also with "output opening device and/or input opening device."

It is preferred that the output opening device and the driveshaft device can in the grinding device be at least sectionally positioned differently relative to one another in a continuous fashion. A thusly designed grinding device makes it possible to achieve a particularly universal construction of the grinding device. A plurality of required geometries of the grinding device particularly can be realized in this way. This typically results in a distinct reduction of the number of different grinding devices to be produced and held in stock. It would naturally be conceivable that certain different grinding devices are still required (wherein these grinding devices are typically distinguished, in particular, with respect to their grinding throughput, their continuous duty strength, a different power of their electric motor and the like (which in other respects also applies to grinding devices that can be non-continuously positioned differently relative to one another)). Although the continuous positioning may in this case be associated with certain disadvantages such as, for example, a more complex design, increased effort for the assembly of the grinding device and the like, these disadvantages are frequently more than overcompensated by the particularly high flexibility.

However, it is also possible that the output opening device and the driveshaft device can be at least sectionally positioned differently relative to one another in an incremental fashion. This may lead to advantages with respect to a simpler mechanical design, a simplified assembly and, in particular, also a very high mechanical stability of individual parts of the grinding device relative to one another, for example, without the corresponding parts "sliding relative to one another" or "turning relative to one another."

Although it may appear strange at first glance, a combination of (sectionally) continuous different positioning and (sectionally) incremental different positioning may also be realized and sensible. On one hand, the different "type" of positioning may refer to different directions. On the other hand, it is also conceivable to use an incremental type of positioning (non-continuous positioning relative to one another) with certain "angular increments" (for example, the ability of an "incremental rotation" by 15°, 30°, 45° or the like). Sectionally continuous different positioning may be realized, for example, with a rotatability of +/−10° (for example, in 15° "increments;" this is advantageous with respect to a certain overlap for a particularly simple assembly). As a result, completely continuous positioning can be realized by combining "step-like increments" and "continuous positioning in certain sections."

The grinding device may be realized in such a way that the different positioning of the output opening device and the driveshaft device relative to one another refers at least to an angular position of the output opening device and the driveshaft device relative to one another, particularly in a plane extending normal to the rotational grinding axis. Projections of the corresponding directions on this plane would naturally also be conceivable such that the output opening device and the driveshaft device may thereby be arranged, for example, at a different "height" of the rotational grinding axis. This type of positioning relative to one another can frequently be realized with lower constructive and mechanical effort. Nevertheless, a particularly broad range of different conceivable (and typical) installation positions can be realized with such an arrangement. Due to the power transmission, such an arrangement furthermore represents an "in essence typically reliable" positioning variation at least for certain types of drive input or the transmission of an "initial motion input."

The grinding device may furthermore feature two subassemblies that can be coupled to one another, wherein the first of the subassemblies, which can be coupled to one another, features the output opening device and the second of the subassemblies, which can be coupled to one another, features the driveshaft device. The output opening device and the driveshaft device typically are realized rigidly or integrally with the respective subassembly. Due to such a design, the "different positioning of the output opening device and the driveshaft device relative to one another is mostly changed" to a different positioning the two subassemblies relative to one another. In the context of this application, these two "theoretical approaches" should accordingly be considered as being equivalent and arbitrarily interchangeable. Due to the proposed design, it is possible to manufacture two subassemblies that can largely be used universally and easily assembled into a grinding device that can be used in a particularly universal fashion. In other respects, it should be possible to separately apply for protection of a kit that features a first subassembly, which features an output opening device, and a second subassembly, which features the driveshaft device, and is constructed and, if applicable, enhanced in accordance with the preceding (and following) description.

An advantageous enhancement can be realized by designing the grinding device in such a way that the driveshaft device and the rotational grinding axis extend skewed to one another and include, in particular, an essentially right angle with one another, wherein the coupling between the driveshaft device and at least one grinding element is preferably realized by utilizing a coupling by means of a worm gear. Such a design frequently provides particular advantages with respect to the occupied structural space and/or the power transmission. This design particularly makes it possible to reduce the rotational speed of a very fast electric motor to a comparatively slow rotational speed of the grinding elements relative to one another in a relatively simple fashion. In this way, superficial burning of the (partially) ground material, which could result in disadvantageous taste changes, can be prevented. With respect to the axes/straight lines that extend skewed to one another, a right angle should in the present context particularly be interpreted such that one straight line (particularly the driveshaft device) lies within (or parallel to) a plane extending normal to another straight line (particularly the rotational grinding axis).

Another advantageous embodiment of the grinding device can be realized if the driveshaft device and the rotational grinding axis are arranged in the grinding device at a distance from one another and, in particular, extend essentially parallel to one another, wherein the coupling between the driveshaft device and at least one grinding element is preferably realized by utilizing a power transmission arrangement, particularly a chain drive, a belt drive or a gearwheel drive. Such a design may prove advantageous, for example, with respect to structural space aspects. It is noted (not only) in this context that a "structural space requirement" does not have to refer to the required structural space only, but may also be "interpreted in a broader sense" and include, for example, the arrangement and position of other components such as coffee bean input shafts, ground coffee discharge channels, brewing devices and the like. Consequently, the "grinding device logistics" may effectively also have to be taken into consideration. In this case, the power transmission may be realized arbitrarily with or without step-up gear or step-down gear. A faster rotational speed of the driveshaft device (electric motor or the like) is typically reduced to a slower rotational speed of the grinding elements relative to one another because this corresponds to conventional technical characteristics.

Another potential design of the grinding device can be realized if it features a position fixing device for fixing the position of the driveshaft device and the output opening device relative to one another, wherein this position fixing device is preferably realized in the form of a reversible position fixing device and/or in the form of an irreversible position fixing device. In the case of a reversible position fixing device, a simple reconfiguration can be realized, which is particularly advantageous with respect to repairs. In the case of an irreversible position fixing device, for example, unauthorized maintenance access can be effectively prevented after the manufacture of the grinding device. In this context, it should be noted that an irreversible position fixing device could conceivably also be realized by utilizing disposable parts such that the position fixing device is in fact irreversible to a certain degree, but an exchange thereof (its replacement with a new position fixing device) merely represents a minor or negligible material expenditure. A "combination" of reversible and irreversible position fixing device would also be conceivable if different position fixing devices are used for different directions and/or in different "variation intervals" (for example a combination of continuous positioning in certain angular ranges and relative positioning in certain increments). It is naturally also conceivable to provide a multitude of position fixing devices that, if applicable, advantageously supplement one another.

The position fixing device in the grinding device may furthermore act non-positively and/or positively and/or integrally and/or be realized in the form of an interlocking device, particularly a device that interlocks in a clip-like and/or in a bayonet-like fashion. These types of position fixing devices proved particularly advantageous in initial tests (to some extent also in combination with one another).

For the sake of completeness, it is noted that a reversible and/or irreversible interconnection is also conceivable if the grinding device is composed of two (or, if applicable, even more) subassemblies to be connected to one another; this connection may act non-positively and/or positively and/or integrally and/or be realized in the form of an interlocking device, particularly a device that interlocks in a clip-like and/or in a bayonet-like fashion.

It is furthermore proposed that the position fixing device in the grinding device is at least partially realized in the form of a device that can be separately handled and/or at least partially cooperates with a device that can be separately handled. In this way, a particularly simple mechanical design can typically be realized. Such a device particularly can be very easily and cost-efficiently produced in the form of a "disposable part" (particularly used in accordance with the preceding description).

It is furthermore proposed that the grinding device features a driving device. This driving device particularly may consist of a preferably integrated electric motor. In such instances, the grinding device consists of a "superior" or "largely integrated" subassembly such that a few steps in the assembly of the "final device" (for example a fully automated coffee machine) can be eliminated.

It is furthermore conceivable that the grinding device features a brewing device. This grinding device also represents a "superior" or "largely integrated" subassembly that can simplify, in particular, the assembly of the "final device."

It is furthermore proposed that the grinding device features just one and/or a multitude of output opening devices and/or that at least one output opening device is arranged in the grinding device in a radially outer region of at least one grinding element. Such a grinding device design meets the typical requirements for grinding devices used in coffee grinders or fully automated coffee machines. A thusly designed grinding device accordingly is particularly interesting with respect to economical considerations and can be used, for example, in the form of a "snap-in" solution.

It is furthermore proposed that the grinding device features at least one grinder casing, particularly a grinder casing with at least one integral output opening device. The finished ground powder (for example coffee power) typically has to be "kept away" from the surroundings because it could otherwise soil the surroundings and, if applicable, impair the function of components located in the vicinity. The hygienic aspect naturally also has to be taken into consideration. As a rule, it is therefore necessary to provide an enclosure in the region of the grinding elements. This enclosure accordingly can be positioned in a region of the typically existing grinding gap between the two grinding elements in order to thereby discharge the ground material in a simple and effective fashion. The output opening typically is slightly offset in the gravitational direction and/or a ground material collecting channel and/or a ground material blower or the like is additionally provided. The use of other ground material output means or auxiliary ground material output means known from the prior art in connection with the proposed grinding device naturally is also conceivable and frequently even sensible.

The invention ultimately also proposes a coffee grinder, a coffee machine and/or a fully automated coffee machine featuring a grinding device with the above-described design. Such a coffee grinder, coffee machine or such a fully automated coffee machine has the above-described advantages and properties at least in an analogous sense. An enhancement in accordance with the preceding description is—at least in analogy—also possible and typically sensible.

Other details of the invention and, in particular, exemplary embodiments of the proposed device are described in greater detail below with reference to the attached drawings. In these drawings:

FIG. 2 shows the first exemplary embodiment of an automated coffee machine grinder 1 in the form of a perspective exploded view;

Figure 7:
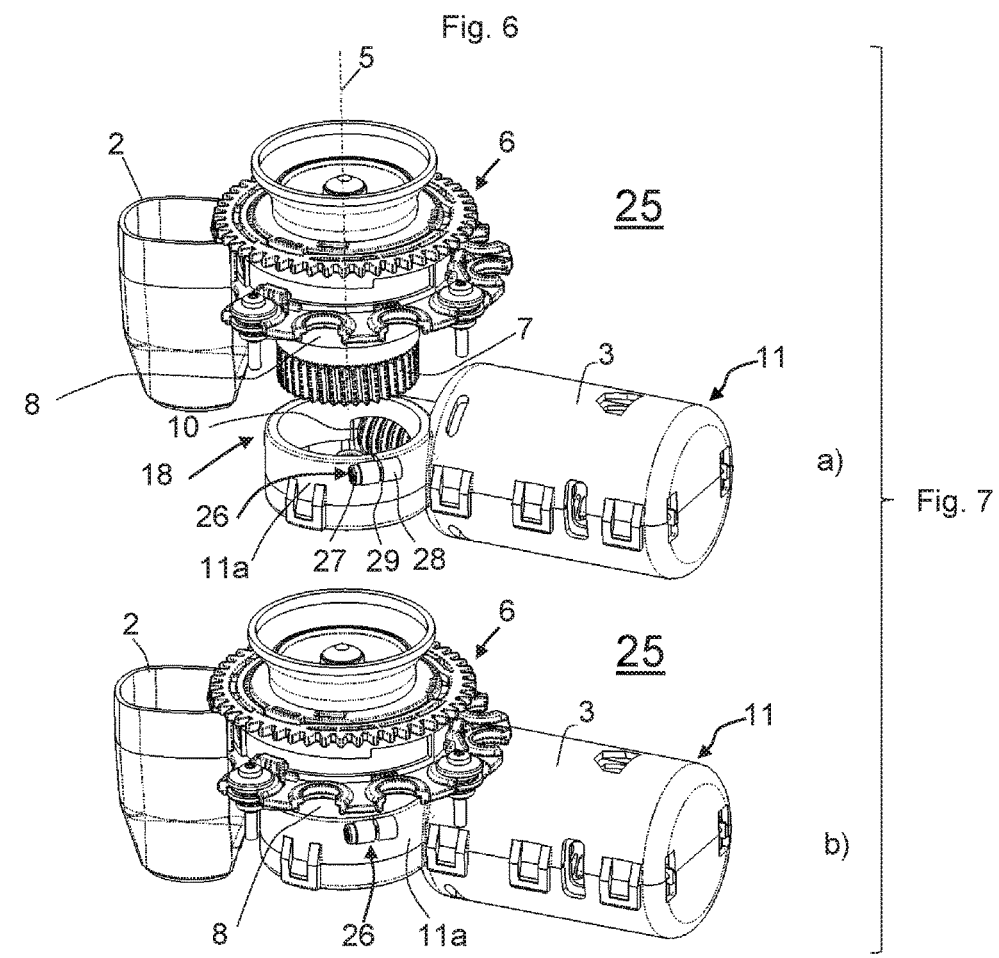

FIGS. 3-6 respectively show the first embodiment of an automated coffee machine grinder during different stages of the assembly, namely in the form of a respective top view a) and in the form of a section b) through a coupling region between a grinder unit and a drive unit;

FIG. 7 respectively shows a second exemplary embodiment of an automated coffee machine grinder during different stages of an assembly process in the form of a perspective view; and FIG. 8 shows a third exemplary embodiment of an automated coffee machine grinder in the form of a longitudinal section a) and in the form of a schematic top view b) from the side.

Figure 1:
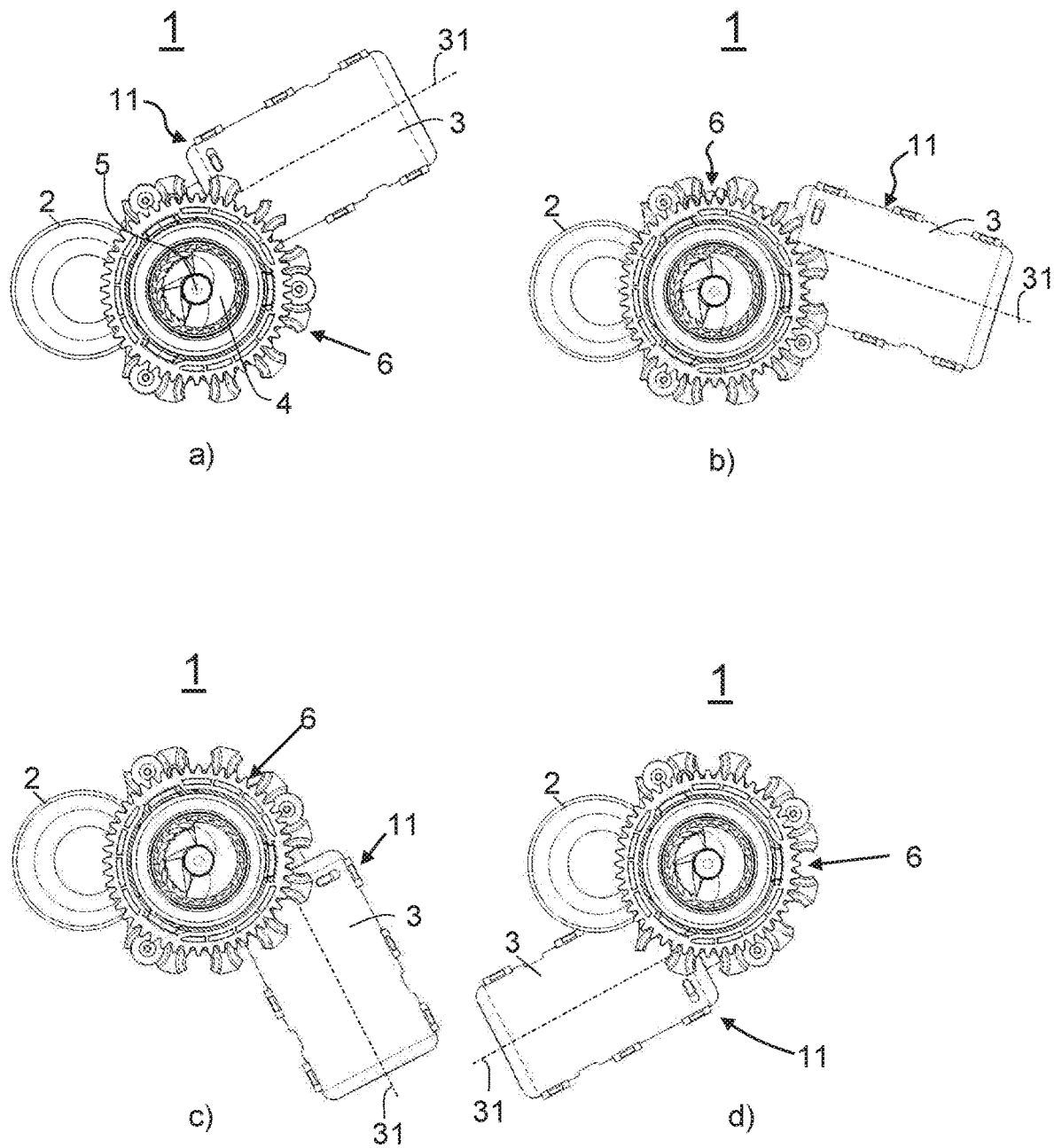
FIG. 1 shows a first exemplary embodiment of an automated coffee machine grinder in different angular positions of an output funnel 2 for ground coffee powder and an electric motor 3 for driving the grinder in the form of a top view.

FIG. 1 shows a first potential exemplary embodiment of an adaptable automated coffee machine grinder 1 in a total of four exemplary chosen positions a) through d). In the exemplary embodiment shown, the "adaptability" refers to a relative rotatability between the electric motor 3 (drive unit 11), which serves for driving the actual grinder consisting of two grinding bodies 4 that are rotatable relative to one another about a rotational axis 5 (perpendicular to the plane of projection in FIG. 1), and the grinder unit 6. Such a design of the grinder unit 6 is generally known. For the sake of completeness only: the upper grinding body 4 features a central opening, through which material to be ground (in the following example coffee beans) can enter the actual grinding region (particularly a grinding slot located between the two grinding bodies 4). The coffee beans are pulverized in the grinding slot and discharged into the output funnel 2, from where they are fed, for example, to a (presently not illustrated) brewing unit through an output opening.

In the exemplary embodiment illustrated in FIG. 1, the electric motor 3, which serves for driving the actual grinder unit 6, is (with respect to its motor spindle 31 extending centrally in the longitudinal direction of the motor casing) respectively arranged perpendicular or skewed to the rotational axis 5 (the motor spindle 31 is not illustrated in greater detail in FIG. 1, but the spatial position of the longitudinal axis of the motor spindle 31 is rather indicated with a dot-dash line identified by the reference symbol 31 in FIGS. 1 and 2).

In the exemplary embodiment illustrated in FIG. 1, the position of the electric motor 3 relative to the output funnel can be changed in 30° increments (change of the included angle between the electric motor 3 and the output funnel 2). According to FIG. 1, a certain angular range cannot be realized (three positioning options can presently not be reached; this corresponds to a "prohibited range" of 90°). A synopsis, in particular, of FIGS. 1, 2 and 6 makes it possible to easily gather that this "prohibited range" is based on mere geometric space considerations: in the chosen design of the automated coffee machine grinder 1, parts of the electric motor 3 and of the output funnel 2 would otherwise have to occupy the same space—which is naturally impossible. In a different design of the automated coffee machine grinder 1, it would naturally be conceivable that this "prohibited range" also "is permitted." It is likewise possible that this "prohibited range" is chosen smaller or larger. The fundamental geometric considerations are readily understandable and reproducible by a person skilled in the art.

The basic transport direction of the material to be ground (prior to the grinding process, during the grinding process and after the grinding process) is also known from the prior art. The already ground product (presently coffee powder) particularly is transferred into the output funnel 2 through a corresponding output opening provided in the casing 8 of the grinder unit 6. Various measures are known for preventing a build-up of ground coffee powder and/or for allowing as little coffee powder as possible to remain in the automated coffee machine grinder 1 between two grinding processes, which sometimes may lie relatively far apart in time. As a rule, these measures can at least largely be realized independently of the presently proposed different positioning of the output funnel 2 and the electric motor 3 relative to one another.

It can be easily gathered that the automated coffee machine grinder 1 can be adapted to various installation situations due to the different relative positioning between the output funnel 2 and the electric motor 3. Consequently, the automated coffee machine grinder 1 can be used in a greater number of differently designed coffee machines, fully automated coffee machines or coffee grinders. It is therefore no longer necessary to produce and store a correspondingly large number of differently aligned automated coffee machine grinders (for stock-keeping purposes) as it was previously required in the prior art.

FIG. 2 shows the automated coffee machine grinder 1 in the form of a perspective exploded view from the top. Additional details with regard to the design of the automated coffee machine grinder 1 can be gathered from this illustration.

For example, this figure shows that the automated coffee machine grinder 1 essentially consists of three prefabricated subassemblies that are connected to one another in an assembly process described in greater detail below.

The actual grinder unit 6 (with the inner grinding bodies that are not illustrated in detail in FIGS. 2-6) forms the upper part of the automated coffee machine grinder 1. The relative motion between the two grinding bodies 4 about a rotational axis 5 is realized in the form of a rotational motion of the lower grinding body 4 with the aid of a gearwheel 7. This gearwheel 7 is connected to the lower grinding body 4 in a torque-proof fashion. The upper grinding body 4 is presently connected to the casing 8 of the grinder unit 6 in a torque-proof fashion. This figure also clearly shows the input funnel 9, through which the coffee beans to be ground are fed to the grinder unit 6.

The drive unit 11 is illustrated in the "center" of FIG. 2, wherein this drive unit is (as described below) assembled and subsequently interlocked with the grinder unit 6 by means of the locking crown 12 illustrated on the bottom in FIG. 2 in order to thereby prevent an unwanted separation of the grinder unit 6 from the drive unit 11 during the operation.

The drive unit 11 features an annular region 11a that serves for accommodating the lower part of the casing 8 of the grinder unit 6, particularly also for accommodating the gearwheel 7. FIG. 2 also shows the worm drive 10 for the gearwheel 7. A rotational motion of the worm drive 10 causes a correspondingly down-geared rotational motion of the gearwheel 7—and therefore a corresponding grinding motion of the grinding bodies 4 relative to one another. The worm drive 10 is mounted on the motor spindle 31 of the electric motor 3 in a torque-proof fashion.

This type of drive for a grinder unit 6 in the form of a worm-gearwheel gearing is basically known from the prior art and used quite frequently. For the sake of brevity, this drive is therefore not described in greater detail.

The locking crown 12 consists of two concentrically arranged rings of protruding pins 13, 14. The outer ring is formed by the actual locking pins 13 whereas the concentric inner ring is formed by snap-in pins 14. The function of the locking pins and the snap-in pins 14 is described in greater detail below. For example, the locking crown 12 may be manufactured in one piece of a plastic material that can be elastically deformed within certain limits. The locking crown 12 particularly can be cost-effectively manufactured by means of an injection molding process. It could therefore be easily designed as a "lost part" or "disposable part." If it is necessary to change the relative position between the electric motor 3 and the output funnel 2, for example, during the course of a repair (or for other reasons), the locking crown 12 can be destroyed in order to be removed and subsequently replaced with a new part without thereby creating a noteworthy economic loss.

Furthermore, FIG. 2 also shows the essential elements of the bayonet-like connection for mechanically coupling the grinder unit 6 and the drive unit 11.

A sequence of transverse webs 15 is annularly arranged in a lower region of the grinder unit 6 (in the present example in 30° increments; the "angular width" of a transverse web 15 amounts to slightly less than 15° because a certain "reserve" for the rotation limiting webs 17, as well as a certain play, also have to be provided in addition to the "angular width" of the locking pins 13.

A sequence of back-locking webs 16 and adjacent (presently integral) rotation limiting webs 17 corresponding to the transverse webs 15 is illustrated (presently also in 30° increments) on the inner side of the coupling region 18 between the grinder unit 6 and the drive unit 11. After a plug-in/rotational motion, the transverse webs 15 and the back-locking webs 16 ensure that the grinder unit 6 and the drive unit 11 can no longer be simply pulled apart from one another. The rotation limiting webs 17 prevent an "excessive" rotational motion such that, for example, the transverse webs 15 and the back-locking webs 16 could once again be disengaged from one another. In this way, a particularly simple and intuitive assembly of the automated coffee machine grinder 1 can be achieved.

The steps for assembling an automated coffee machine grinder 1 (according to the first exemplary embodiment illustrated in FIGS. 1 and 2) of the three "basic subassemblies" grinder unit 6, drive unit 11 and locking crown 12 are illustrated in FIGS. 3-6 and described in greater detail below. In this respect, FIGS. 3-6 respectively show a perspective view of the automated coffee machine grinder 1 (or of its partial subassemblies grinder unit 6, drive unit 11 and locking crown 12) in the partial figures a) whereas the partial figures b) respectively show an enlarged cross-sectional view of part of the coupling region 18 between the grinder unit 6 and the drive unit 11 (subsequently also with the locking crown 12 in position), wherein the latter are intended to better elucidate details of the plug-in/rotary interlocking joint between the subassemblies of the automated coffee machine grinder 1.

In a first step (FIG. 3), the grinder unit 6 and the drive unit 11 are initially assembled in their coupling region 18 by moving said units toward one another (antiparallel joining arrows 19), wherein the gearwheel 7 is inserted into the annular region 11a of the drive unit in such a way that the gearwheel 7 is engaged with the worm drive 10. In order to realize this joining motion, the transverse webs 15 have to be arranged in such a way that they are respectively aligned with the gaps between two back-locking webs 16 (see also FIG. 2). This also shows that the joining process is simplified due to a certain "angular play," which is why the total "angular length" of the transverse web 15, the back-locking web 16 and the rotation limiting web 17 is slightly smaller than the increments (presently 30° increments). The joining motion along the antiparallel joining arrows 19 takes place until the grinder unit 6 and the drive unit 11 are "firmly" attached to one another. In this position, the transverse webs 15 are located "underneath" the back-locking webs 16 (corresponding situation in FIG. 3b); in FIG. 3a), the joining motion is not yet completely realized.

Figure 4:
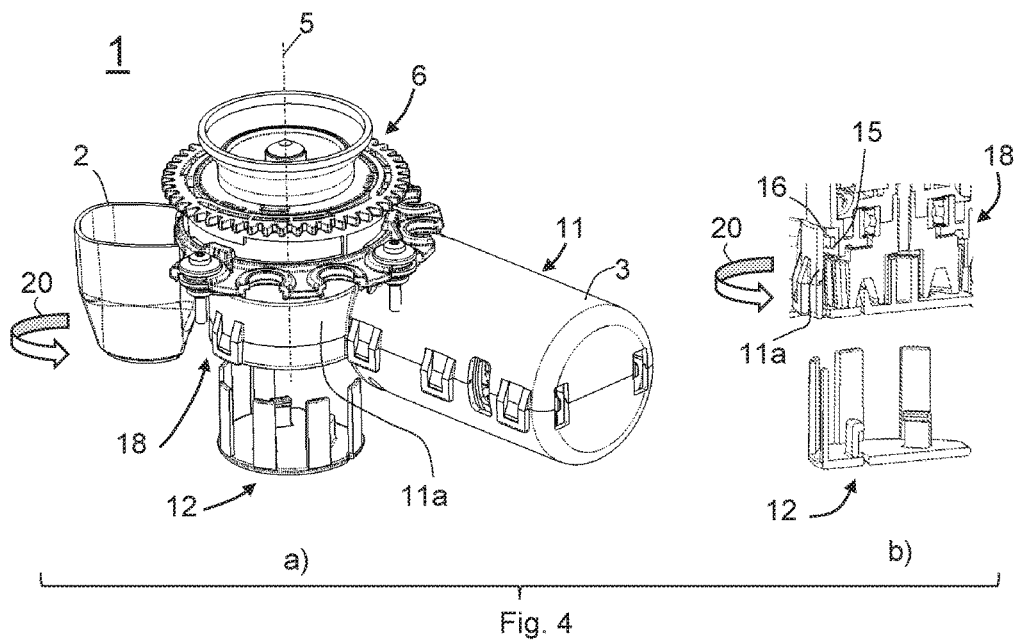

For the sake of completeness, it is noted that the respective locking crowns 12 illustrated in FIGS. 3 and 4 are irrelevant to the assembly steps illustrated in these figures and may be readily stored within reach in a storage jar.

After the assembly motion along the joining arrows 19 has been completed, a relative rotational motion between the grinder unit 6 and the drive unit 11 (indicated by the rotational arrow 20; see FIG. 4) is carried out. This causes the back-locking webs 16 to slide behind the respectively corresponding rear side of the transverse webs 15. As a result, the two subassemblies grinder unit 6 and drive unit 11 no longer can be separated from one another by simply being pulled apart.

The aforementioned rotation limiting webs 17 are provided in order to simplify the assembly for the assembler. These webs form a "stop" in the angular direction. This prevents an "excessive rotation" of the two subassemblies 6, 11 relative to one another (which could result in the transverse webs 15 and the back-locking webs 16 once again being disengaged).

Figure 5:
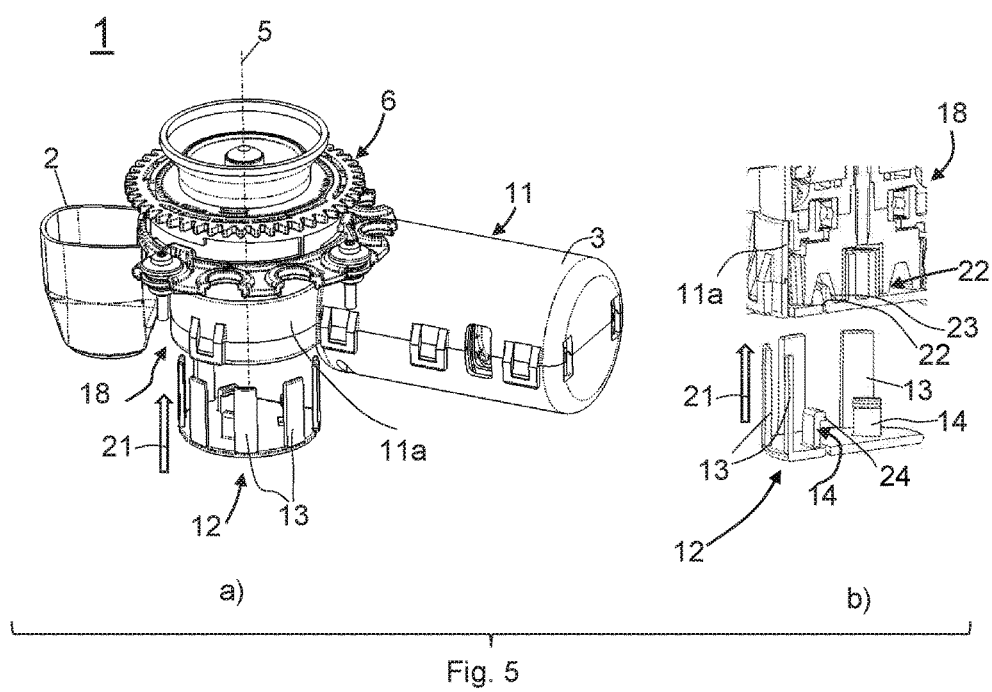

After the rotational motion (along the rotational arrow 20) has been completed, the rotation limiting webs 17 are in contact with the respective sidewalls of the back-locking webs 16 on their L-inner surface. The locking step illustrated in FIG. 5 is now carried out. For this purpose, the locking crown 12 is inserted into the coupling region 18 between the grinder unit 6 and the drive unit 11 (in the direction indicated with the displacement arrow 21) in the "correct angular position". The locking pins 13 are thereby pushed into the coupling region 18 such that they ultimately come to rest in the gaps between the individual back-locking webs 16. It is noted that the transverse webs 15 and the back-locking webs 16 are positioned behind one another such that they are effectively aligned in the axial direction at the time, at which the locking step illustrated in FIG. 5 is carried out. Due to the insertion of the locking pins 13 into the corresponding gaps, an oppositely directed relative rotational motion between the grinder unit 6 and the drive unit 11 becomes impossible. This is achieved in that the transverse webs 15 abut on the locking pins 13 with their side that lies opposite of the limb of the L (the contact region with the side lying opposite of the rotation limiting webs 17), if applicable, after traveling no more than a slight angular distance. This once again makes it impossible to disengage the transverse webs 15 and the back-locking webs 16 (at least as long as the locking crown 12 is in position) and to thereby separate the grinder unit 6 and the drive unit 11 from one another.

In order to clearly indicate the correct position in the angular direction to the assembler, slot-like recesses 22 corresponding to the snap-in pins 14 are provided in a bottom area of the coupling region 18 of the drive unit 11. The angular width of the slot-like recesses 22 is essentially identical to the angular width of the snap-in pins 14. The position is chosen such that the correct angular position of the locking pins 13 results "automatically."

Figure 6:
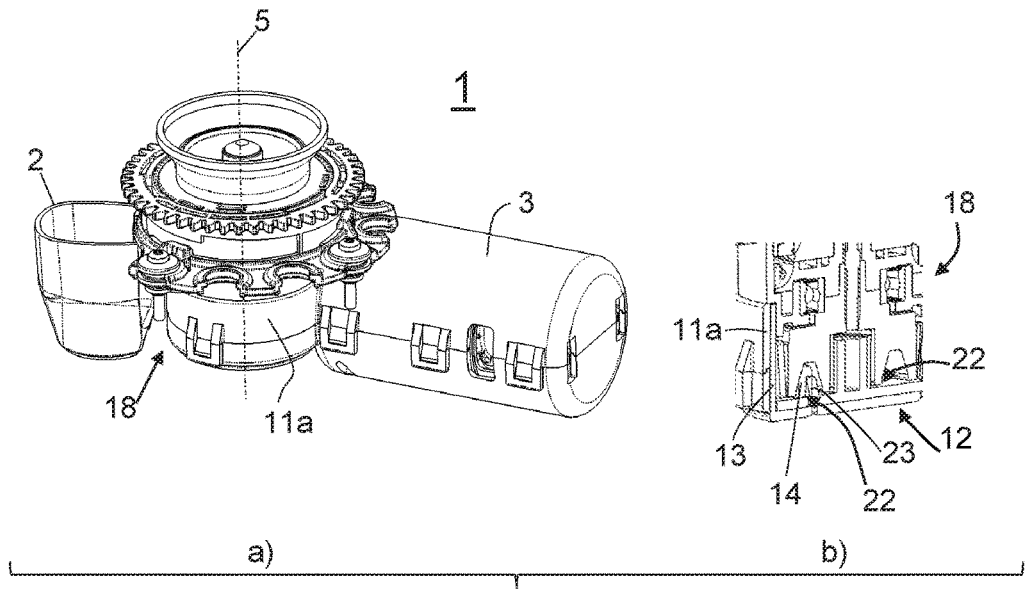

When the locking crown 12 is completely pushed in, the protruding tabs 24 of the snap-in pins 14 interlock with suitably designed webs 23 in the region of the slot-like recesses 22 (FIG. 6).

In this way, a complete assembly of the automated coffee machine grinder 1 is achieved, wherein the basic subassemblies of the automated coffee machine grinder 1 no longer can be readily separated from one another. However, it is once again noted that the described assembly process of the automated coffee machine grinder 1 can be carried out in different angular positions of the output funnel 2 and the electric motor 3 relative to one another. The angle between the output funnel 2 and the electric motor 3 illustrated in FIGS. 2-6 should merely be interpreted as an example.

In other respects, the locking crown 12 can once again be pulled out (or, if applicable, broken out) of the coupling region 18, for example, with the aid of a screwdriver. This in turn makes it possible to once again separate the grinder unit 6 and the drive unit 11 from one another. It is irrelevant if the locking crown 12 is broken during this process because it consists of a simple component that can be cost-effectively manufactured, for example an injection molded plastic part.

FIG. 7 furthermore shows a second exemplary embodiment of an automated coffee machine grinder 25. In this case, partial FIG. 7a) shows the state prior to the assembly of the main subassemblies grinder unit 6 and drive unit 11. In partial figure b), the two main subassemblies 6, 11 are already assembled, wherein a lower edge of the casing 8 of the grinder unit 6 and the gearwheel 7 are inserted into the annular region 11a of the drive unit 11 such that the lower edge of the casing 8 of the grinder unit 6 is annularly enclosed by the region 11a of the drive unit 11 and the gearwheel 7 is engaged with the worm drive 10. A perspective view is respectively chosen in both partial figures a) and b) of FIG. 7. A majority of the subassemblies used corresponds to the subassemblies of an automated coffee machine grinder 1 that are illustrated in FIGS. 1-6 and were described in detail above.

In contrast to the first exemplary embodiment, relative positioning between the grinder unit 6 and the drive unit 11 (output funnel 2 and electric motor 3) can be realized with arbitrary relative angles in the presently described exemplary embodiment of an automated coffee machine grinder 25. It is therefore not only possible to adjust individual, discrete angular positions relative to one another, but also to continuously adapt the angular positions. This is achieved in that—if the grinder unit 6 and the drive unit 11 are assembled in accordance with the illustration in partial figure b) of FIG. 7—the annular region 11a is rotatably supported on the lower edge of the casing 8 of the grinder unit 6 in such a way that the drive unit 11 is rotatable about the rotational axis 5 of the grinder unit 6.

For the sake of completeness only, it is noted that a "prohibited range" of the relative positions between the output funnel 2 and the electric motor 3 also exists in the presently described second exemplary embodiment of an automated coffee machine grinder 25 analogous to the first exemplary embodiment, wherein this is likewise the result of geometric circumstances and was described in detail above.

In order to realize the continuous adaptability of the second exemplary embodiment of an automated coffee machine grinder 25, a length variation device 26 realized similar to a hose clamp is provided between the grinder unit 6 and the drive unit 11 on the annular region 11*a* of the drive unit 11 around the coupling region 18. In the example shown, the length variation device 26 consists of a screw 27 that can be respectively screwed into or out of an internal thread 28 in the form of a rotational motion. The rotational motion of the screw 27 accordingly increases or decreases a radial slot 29 such that the regions of the grinder unit 6 and the drive unit 11, which are inserted into one another in the coupling region 18, respectively are firmly clamped together or separated. If the radial slot 29 is reduced by rotating the screw 27 to a predefined extent, the diameter of the annular region 11*a* is reduced in such a way that the annular region 11*a* of the drive unit 11 is firmly seated on the lower edge of the casing 8 of the grinder unit 6 and the drive unit 11 therefore is no longer rotatable relative to the grinder unit 6 and the output funnel 2, respectively. If the radial slot 29 is increased again by rotating the screw 27, the annular region 11*a* of the drive unit 11 is once again separated from the lower edge of the casing 8 of the grinder unit 6 such that the drive unit 11 subsequently can be rotated about the rotational axis 5 again and moved into a different angular position relative to the output funnel 2.

FIG. 8 ultimately shows a third exemplary embodiment of an automated coffee machine grinder 30. This embodiment is intended to elucidate that it is by all means possible to arrange the motor spindle 31 of the electric motor 3 parallel, but laterally offset to a rotational axis 5 of the grinding bodies 4 of a grinder unit 6. Nevertheless, it is in this embodiment also possible to realize a different angular arrangement of the grinder unit 6 and the drive unit 11 (output funnel 2 and electric motor 3) by means of a "variable" coupling region 18. In this case, the coupling region 18 may either be realized with a snap-in coupling in accordance with the first exemplary embodiment of an automated coffee machine grinder 1 or with a length variation device 28 in accordance with the second exemplary embodiment of an automated coffee machine grinder 25. Accordingly, no details in this respect are illustrated in FIG. 8. In any case, it is possible to change the spatial position of the drive unit 11 relative to the output funnel 2, wherein the drive unit 11 is rotatable about the rotational axis 5 of the grinder unit 6 together with the annular region 11*a*.

For the sake of completeness, it is noted that the power transmission between the motor spindle 31 and (one of the) grinding bodies 4 is in the illustrated third exemplary embodiment of an automated coffee machine grinder 30 realized by means of two meshing gearwheels 32.

The invention claimed is:

1. A grinding device for grinding material to be ground, featuring
a first grinding element and
a second grinding element, as well as
an output opening device for ground material that is arranged laterally of the grinding elements,
wherein the first grinding element and the second grinding element are arranged with respect to each other so that a grinding slot located between the first grinding element and the second grinding element is provided,
wherein the first grinding element and the second grinding element are configured to be driven by means of a driveshaft device such that the first grinding element and the second grinding element rotate relative to one another about a rotational grinding axis and are enabled to pulverize material to be ground in the grinding slot during a rotation of the first grinding element and the second grinding element relative to one another about the rotational grinding axis,
wherein the driveshaft device is arranged divergent from the rotational grinding axis, and
wherein the output opening device and the driveshaft device are configured to be positioned in different positions relative to one another.

2. The grinding device according to claim 1, wherein the output opening device and the driveshaft device are configured to be at least sectionally positioned in different positions relative to one another in a continuous fashion.

3. The grinding device according to claim 1, wherein the output opening device and the driveshaft device are configured to be at least sectionally positioned in different positions relative to one another in an incremental fashion.

4. The grinding device according to claim 1, wherein the different positioning of the output opening device and the driveshaft device relative to one another refers at least to an angular position of the output opening device and the driveshaft device relative to one another.

5. The grinding device according to claim 1, wherein the grinding device features first and second subassemblies that are configured to be coupled to one another, wherein the first subassembly features the output opening device and the second subassembly features the driveshaft device (10, 31).

6. The grinding device according to claim 1,
wherein the driveshaft device and the rotational grinding axis extend skewed to one another, and
wherein the driveshaft device and at least one of the first grinding element and the second grinding element are coupled to one another by means of a worm gear.

7. The grinding device according to claim 1,
wherein the driveshaft device and the rotational grinding axis are spaced apart from one another, and
wherein the driveshaft device and at least one of the first grinding element and the second grinding element are coupled to one another by a power transmission arrangement.

8. The grinding device according to claim 1, comprising a position fixing device for fixing the position of the driveshaft device and the output opening device relative to one another.

9. The grinding device according to claim 8, wherein the position fixing device is configured to interconnect the driveshaft device and the output opening device in at least one of a non-positively interlocking manner, a positively interlocking manner, and an integrally interlocking manner.

10. The grinding device according to claim 8, wherein the position fixing device is realized in the form of a device that is configured to be handled separately and/or to cooperate with a device that is configured to be handled separately.

11. The grinding device according to claim 1, comprising a drive unit configured to cause a rotational motion of the driveshaft device for enabling the first grinding element and the second grinding element to be driven by the driveshaft device such that the first grinding element and the second grinding element rotate relative to one another about the rotational grinding axis.

12. The grinding device according to claim 1, comprising a brewing device for brewing ground material, wherein the brewing device is arranged with respect to the output opening device so that ground material is enabled to be fed from the output opening device to the brewing device.

13. The grinding device according to claim 1, comprising just one and/or a multitude of output opening devices and/or wherein at least one output opening device is arranged in a radially outer region of at least one grinding element.

14. The grinding device according to claim 1, comprising at least one grinder casing.

15. A coffee grinder, coffee machine or fully automated coffee machine featuring a grinding device according for grinding material to be ground comprising a first grinding element and a second grinding element, as well as an output opening device for ground material that is arranged laterally of the grinding elements, wherein the first grinding element and the second grinding element are configured to be driven by means of a driveshaft device such that the first grinding element and the second grinding element rotate relative to one another about a rotational grinding axis, wherein the driveshaft device is arranged divergent from the rotational grinding axis, and wherein the output opening device and the driveshaft device are configured to be positioned in different positions relative to one another.

16. The grinding device according to claim 8, wherein the position fixing device is realized in the form of a reversible position fixing device.

17. The grinding device according to claim 8, wherein the position fixing device is realized in the form of an irreversible position fixing device.

18. The grinding device according to claim 9, wherein the position fixing device is realized in the form of an interlocking device configured to interlock in a clip-like and/or in a bayonet-like fashion.

19. The grinding device according to claim 11, wherein the drive unit is configured as an electric motor.

* * * * *